United States Patent Office 2,872,281
Patented Feb. 3, 1959

2,872,281
CORROSION INHIBITING

Harry L. Kahler, Feasterville, and Charles B. George, Philadelphia, Pa., assignors, by mesne assignments, to Betz Laboratories, Inc., a corporation of Pennsylvania No Drawing. Application March 24, 1954
Serial No. 418,458

11 Claims. (Cl. 21—2.7)

The present invention relates to new and improved corrosion inhibitory compositions and to new and improved processes for inhibiting corrosion.

The present application is related to Kahler and George U. S. patent application Serial No. 390,916, filed November 9, 1953, for Corrosion Inhibiting, now U. S. Patent No. 2,793,932, granted May 28, 1957.

The compositions of the present invention are particularly effective in preventing or reducing corrosion produced on metal surfaces in contact with water. Such compositions are particularly applicable to cooling towers, air-conditioning systems, condensers, heat exchangers, and distributing systems where water constitutes the corroding medium and ferrous or nonferrous metals or both constitute the material susceptible to corrosion attack.

It has been known for many years that various water soluble phosphates will inhibit water corrosion under certain conditions and extensive use has been made of such phosphate compounds. However, in order to use phosphates effectively, it is necesary to adjust their dosage to such factors as velocity of the water stream, temperature, chemical composition of the water, and other added ingredients. Thus, higher water velocities require lower phosphate concentrations, higher water temperatures require higher phosphate concentrations, and higher concentrations of chlorides, sulphates and other similar ions necessitate the use of higher concentrations of phosphate. Because of this rather direct influence of environmental factors on the effectiveness of phosphates in inhibiting corrosion, some investigators, aware of erratic results, have concluded that their behavior could not be predicted in any given case and that accordingly the phosphates must be considered somewhat unreliable inhibitors for general use. The same investigators class phosphates as dangerous inhibitors (P. Hamer and L. Powell, Metallic Corrosion, Passivity and Protection; U. R. Evans, Corrosion (2d edition, Longmans, Green and Company)).

The present inventors have investigated phosphates alone and have found them to have inferior inhibitory powers over a considerable range of concentrations and under diverse conditions, especially because intensive and dangerous pitting took place.

Notwithstanding these difficulties, phosphates have continued to be used because of their advantages of low cost, ease of use, and the by-product advantage of sequestering power for the reduction of scale. Likewise considerable effort has been directed to improving the corrosion inhibitory behavior of phosphates.

One of the present inventors has taken steps in that direction by combining phosphates with chromates, as set forth in co-pending application Serial No. 364,871, filed June 29, 1953, for Corrosion Protection in Water Systems, now U. S. Patent No. 2,711,391, granted June 21, 1955.

The present inventors in a continued study to obtain further improvement in corrosion inhibitory treatments for use in water media, have discovered that various additive materials can be used with phosphates or compositions containing phosphates so that greatly improved inhibitory power is obtained. We have also discovered a new process for utilizing these additive materials to obtain pronounced improvements in effectiveness of results and economy.

A purpose of the present invention is to obtain new and improved corrosion inhibitory compositions.

A further purpose is to provide a water treating composition of improved inhibitory power which derives a part of its effectiveness from the presence of a water soluble phosphate compound, such as a water soluble complex or molecularly dehydrated phosphate, or a water soluble orthophosphate or a combination of both, used with a water soluble trivalent chromium compound. The materials of this soluble composition are introduced into the corrosive water in such a manner that the solubility is exceeded with resultant deposition on the metal surfaces in contact with the water. The deposit is adherent and very protective against corrosive water. The highly insoluble compounds of the deposit are intended to include only those resulting from the reaction of the treatment materials while they are in the main body of the cooling water. Accompanying reactions of corrosion at the water-metal interface to produce coatings on the metal surfaces are purely coincidental and, we believe, not beneficial, as weight losses of metals are too small to be significant after the protective coating has been deposited. Since this is true for many different metals, we believe that the coating mechanism is in no way associated with the corrosion processes.

A further purpose of the invention is to provide a composition of improved inhibitory power containing a water soluble phosphate compound, preferably a complex or molecularly dehydrated phosphate, or an orthophosphate, or a combination of both together, with a water soluble chromate compound containing hexavalent chromium, and a water soluble trivalent chromium compound. The materials of this composition are introduced into the corrosive water in such a manner that compounds are developed in excess of their solubility with the resultant precipitation of a coating on the metal surfaces in contact therewith. The highly insoluble compounds of the deposit are intended to include only those resulting from the reaction of the treatment materials discussed above with the chromate and the phosphate. Concomitant reactions of corrosion to produce coatings on metal surfaces are purely coincidental and no benefits appear to accrue from the same.

A further purpose of the invention is to provide a water-treating composition of improved corrosion inhibitory power containing a water soluble phosphate, preferably a complex or molecularly dehydrated phosphate, or an orthophosphate, or a combination of both together, with a water-soluble chromate compound containing hexavalent chromium and a water-soluble molybdate compound containing hexavalent molybdenum.

A further purpose is to employ for corrosion inhibition in a water solution from 1 to 1000 p. p. m., and preferably from 1 to 200 p. p. m., of water-soluble phosphate compound, preferably complex phosphate, along with from 0.1 to 100 p. p. m., preferably from 0.2 and 25 p. p. m., of trivalent chromium ion and to maintain a pH in the water between 3 and 8.5 and preferably between 5 and 8.2.

A further purpose is to inhibit corrosion in an industrial water system and thus protect the metallic parts by introducing into the water from 1 to 1000 and preferably from 1 to 200 p. p. m. of water-soluble phosphate compound, preferably complex phosphate, along with 1 to 1000 p. p. m., preferably 1 to 200 p. p. m., of water-soluble chromate compound, and along with from 0.1 to 100 p. p. m. and preferably from 0.2 to 25 p. p. m. calculated as metal ion of a compound of the class which consists of water-soluble compounds of trivalent chromium and water-soluble compounds hexavalent molybdenum, and to maintain a pH range between 3 and 8.5 and preferably between 5 and 8.2 in the trivalent chromium ion and between 5 and 9 and preferably between 5.5 and 8.5 in the case of hexavalent molybdenum ion.

A further purpose is to accompany any one of the above treatments with the addition of an organic reducing agent of the class which consists of sugars, alcohols, lignins and tannins in a concentration of 1 to 1000 p. p. m. and preferably 5 to 200 p. p. m.

Thus, it will be evident that in the invention we employ a phosphate, preferably a molecularly dehydrated phosphate or less desirably an orthophosphate, and that the phosphate may be used with any one of the following additional materials:

(1) A water soluble trivalent chromium compound.
(2) A chromate and a water soluble trivalent chromium compound.
(3) A chromate and a hexavalent molybdenum compound.
(4) A chromate, a trivalent chromium compound and a hexavalent molybdenum compound.

Thus, it has been found that exceptional results are realized when a phosphate is combined with a water-soluble chromium compound, with a chromate compound and a trivalent chromium compound, or with a chromate compound and a hexavalent molybdenum compound, or with a chromate compound, a trivalent chromium compound and a hexavalent molybdenum compound. The advantageous features of using chromate along with trivalent chromium ion are included in our copending application Serial No. 390,916 above referred to, now U. S. Patent 2,793,932.

To illustrate the benefits of these improved corrosion inhibitory treatments, the results of a series of evaluatory tests are submitted herewith. In this series, tests were made on a ground surface high carbon steel specimen of normal corrodibility to permit a comparison and evaluation of inhibitory functions and powers. The several corrosion speciments were examined to evaluate pitting particularly as set forth in copending application Serial No. 364,871, now U. S. Patent No. 2,711,391.

Table I illustrates the various types of waters used. Analysis of the Philadelphia tap water involved is as follows:

Calcium _____ 50 p. p. m. as Ca CO_3.
Magnesium _____ 30 p. p. m. as CaCO_3.
Bicarbonate alkalinity _____ 30 p. p. m. as CaCO_3.
Chloride _____ 14 p. p. m.
Sulphate _____ 30 p. p. m.

The medium hardness, low chloride water is a Philadelphia tap water of the above analysis with added ions to increase calcium to 110 to 130 p. p. m., magnesium to 40 to 50 p. p. m., and bicarbonate alkalinity to 110 to 130 p. p. m., all calculated as calcium carbonate, and to increase sulphate ion to 70 to 80 p. p. m.

TABLE I

| Type | Water Composition |
|---|---|
| II | Philadelphia tap water with 500 p. p. m. chloride ion added. |
| III | Philadelphia tap water with 500 p. p. m. chloride ion added and 300 p. p. m. sulphate ion added. |
| IV | Medium hardness, low chloride water as set forth above. |

Table II sets forth the various treatment compositions which were tested, expressed in terms of the materials indicated at the headings of the columns. In treatment composition J the 6.9 p. p. m. of hexavalent molybdenum ion is equivalent to 15 p. p. m. of sodium molybdate.

TABLE II

| Treatment Compositions | Sodium Chromate, p. p. m. | Disodium Phosphate, p. p. m. | Sodium Tri-Poly-phosphate, p. p. m. | Chromium as $Cr^{+++}$, p. p. m. | Molybdenum as $Mo^{6+}$, p. p. m. |
|---|---|---|---|---|---|
| A | | 26 | 26 | | |
| B | | | | 2 | |
| C | 15 | | | | |
| D | 15 | | | 2 | |
| E | | 28 | 26 | 3 | |
| F | 5 | | 10 | | |
| G | 5 | | 10 | 2 | |
| H | 5 | | 10 | | 2 |
| J | | | | | 6.9 |
| M | | | 40 | 3 | |
| N | | | 40 | 1 | |
| O | 2.5 | | 5 | | |
| P | 2.5 | | 5 | | 4 |

The test results are given in Table III, which gives the result of one day tests on specimens having a test area of 3" x ½" x 1/16".

The apparatus used for the laboratory experiments was a continuous flowing experimental water system divided into two sections, one section of specimens receiving the water having the inhibitor and the other section of specimens receiving the control water. This system therefore permitted the testing of one control and one treatment experiment simultaneously or two controls or two treatment experiments. Down stream from the points of addition of the inhibitor, corrosion test specimens were exposed to the water. The flow rate used during the tests was 0.35 foot per second and the temperature was 120° F. The specimens were flat steel sheets having a composition of 0.9% carbon, 1.4% manganese, 0.04% sulphur, 0.3% silicon, no phosphorus, balance iron. Before exposure the specimens were resurfaced using a No. 80 grit grinding wheel to a machined surface of R. M. S. 20 micro-inches to allow for accurate evaluation of pits.

Before immersion, the specimens were cleaned with tripoli (an abrasive) and trisodium phosphate followed by a water rinse, an alcohol rinse, and drying. The oxygen in the test water was kept at 5 p. p. m. The specimens were evaluated at a magnification of 20 diameters.

TABLE III

| Test No. | Treatment | Type Water | pH | Wt. Loss (Mgs.) | Coating (Ppted.) | Products (Corrosion) | Tubercles | Attack | Distribution |
|---|---|---|---|---|---|---|---|---|---|
| 1 | None | IV | 7.4 | 174 | None | Red | Yes | General | Overall. |
| 2 | None | II | | 126 | do | do | Yes | do | Do. |
| 3 | A | II | 6.0 | 28 | do | Brown Thin | Numerous | Pitting | Wide. |
| 4 | B | II | 6.0 | 37 | Blue-Green | Red | Some | Varied | Do. |
| 5 | C | IV | 6.0 | 4 | None | Tan Red | Yes, black | Pitting | |
| 6 | D | IV | 6.0 | 2 | Blue-Green | Slight | Few Tiny | Tiny Pits and Shallow. | |
| 7 | E | III | 6.0 | 1 | do | No | Couple | Pitting | Trace. |
| 8 | F | II | 6.0 | 5 | None | Brown Thin | Numerous | Shallow Pits | Numerous. |
| 9 | G | II | 6.0 | 3 | Blue-Green | Some | Some | do | Moderate. |
| 10 | H | II | 6.0 | 5 | None | Brown Thin | Couple Tiny | Tiny Pits | Few. |
| 13 | J | II | 6.0 | 121 | As Test No. 2 above. | No apparent difference. | | | |
| 14 | O | II | 6.0 | 30 | None | Red and black | Incipient | General Overall | |
| 15 | P | II | 6.0 | 10 | do | do | do | General Restricted | |

As previously explained, phosphates have been of uncertain value as inhibitors over their entire permissible range of concentration. Chromates, on the other hand, although possessing a high susceptibility to localized attack, pitting and tuberculation, have possessed the power to completely stifle attack when used in adequate concentrations. Minimum concentrations of 200 to 1000 p. p. m. of water-soluble chromate compound offer fair protection depending upon the corrosion load.

Tests in the series shown in Table III and Table IV were made with treatments formulated at concentration levels below adequate inhibition to provide a margin for judging improvements with the new compositions. The results shown are offered to illustrate the benefits of the invention, and not as suggestive of concentrations and formulations which would be recommended as fully adequate, and also not with the purpose of limiting the disclosure.

Example 1

In a corrosive water of type II, a treatment consisting of 26 p. p. m. of sodium tripolyphosphate and 26 p. p. m. of sodium orthophosphate and 2.0 p. p. m. of trivalent chromium ion in the form of chromic chloride was found to exhibit remarkably effective corrosion inhibitory behavior. Whereas the use of water-soluble phosphate alone without the chromium ion decreased metal loss from 126 milligrams to 28 milligrams in one day, a treatment with phosphate and trivalent chromium ion as above set forth reduced the weight loss to one milligram. It is evident that this improved behavior was specifically due to the combination in view of the results of Table III, test IV, wherein trivalent chromium ion alone was used and the metal loss under the same conditions was reduced only to 37 milligrams. In addition to the improvement in metal savings, the phosphate-chromate ion combination further prevented the formation of corrosion products and vastly reduced the incidence of tuberculation and pitting.

Example 2

A treatment consisting of 10 p. p. m. of sodium tripolyphosphate and 5 p. p. m. of sodium chromate and 2.0 p. p. m. of trivalent chromium ion in the form of trivalent chromium chloride was subjected to a test similar to that of Example 1. It produced remarkably effective corrosion inhibition, providing a reduction in weight loss from 126 milligrams in a control test to 3 milligrams under the same conditions in accordance with the invention. Although a treatment with 15 p. p. m. sodium chromate alone gave a high metal saving, as did a treatment with 10 p. p. m. of sodium tripolyphosphate and 5 p. p. m. sodium chromate, the addition of the trivalent chromium ion reduced the incidence of pitting as well as preventing the continuation of localized attack which would lead to early perforation of the metal. The few pits which did occur when trivalent chromium ion was used with phosphate and chromate as above, were more widely dispersed and more shallow than when chromate alone was used or phosphate and chromate were used as above set forth, and with no increase in metal loss.

Example 3

A treatment consisting of 10 p. p. m. of sodium tripolyphosphate with 5 p. p. m. of sodium chromate and 2 p. p. m. of sodium molybdate calculated as hexavalent molybdenum ion, gave remarkably good results in inhibiting corrosion by reducing metal loss on one day test from 126 milligrams to 5 milligrams. In comparison to 10 p. p. m. of sodium tripolyphosphate and 5 p. p. m. of sodium chromate, the combined treatment with phosphate-chromate-molybdenum, although not showing added effectiveness in metal saving, greatly reduced the incidence of tuberculation and pitting, so as to improve greatly the effectiveness of the treatment.

Using lower concentrations of 5 p. p. m. sodium tripolyphosphate and 2.5 p. p. m. sodium chromate, the addition of 2.0 p. p. m. sodium molybdate calculated as hexavalent molybdenum ion was very effective in reducing metal loss. This low concentration of phosphate plus chromate (without molybdenum) reduced metal loss from 126 milligrams to 30 milligrams on one day test, but was not capable of fully preventing pitting attack. The addition of 2 p. p. m. of hexavalent molybdenum ion reduced the metal loss on one day test to 10 milligrams, and improved protection against pitting, while reducing the formation of corrosion products. It is evident that this combination itself was responsible for the good results, since Table III, test 13 using as much as 15 p. p. m. sodium molybdate alone was almost completely ineffective in reducing metal loss or otherwise improving the attack pattern.

In the examples given, we have shown the benefits which results from the application of our improved corrosion inhibitory treatments. However, it should be emphasized, particularly in the instances of formulations containing soluble trivalent chromium ion, that benefits are derived through the application of a protective method heretofore never associated with treatments containing phosphates and chromates. The use of phosphate and chromate treatments as previously practiced has required their complete solubility at all times, with particular emphasis on avoiding any form of precipitation such as tricalcium phosphate. Any minor benefits which might have resulted from precipitation of calcium phosphate coating are more than offset by difficulties of operation due to reduction in flow, decrease in heat transfer, and lack of uniformity of protection throughout the system. On the other hand, the use of a coating type of inhibitory behavior such as is realized through the presence of trivalent chromium ion is remarkably beneficial. As will be noted in Table III, the trivalent chromium ion was responsible for producing a light blue or blue-green precipitated coating which was directly instrumental in giving improved corrosion inhibitory power over formulations of similar materials which lacked this coating agent. The use of this character of coating for corrosion protection is believed to be novel. The presence of phosphate with this coating is an improvement since it converts the coating from one which is primarily chromic hydroxide to one which includes chromic phosphate and is superior in adherence, uniformity of appearance, and effectiveness in preventing corrosion.

It has been found that formulations containing trivalent chromium best function in the pH range of 3 to 8.5 which constitute the insolubility limits of the chromium precipitates which are formed. Below a pH of 3 the chromic ion remains soluble, while above a pH of about 8.5 it exhibits its amphoteric character and is again soluble. Levels of concentration to provide the coating which can be included in effective formulations vary extensively. Better results in the form of better coatings are obtained in the preferred pH range of 5 to 8.2.

Phosphates employed should be water-soluble phosphate compounds, preferably molecularly dehydrated or complex phosphates such as sodium tripolyphosphate, sodium decaphosphate, sodium hexametaphosphate, sodium tetraphosphate, and corresponding potassium, lithium, ammonium and other water soluble salts, which are characterized by a range of $Na_2O$ or the equivalent to $P_2O_5$ between 1:1 and 2:1. Orthophosphates may less desirably be used, such as disodium phosphate, monosodium phosphate, trisodium phosphate and corresponding potassium, lithium and ammonium and other water-soluble phosphates, and phosphoric acid. The concentration level of the water-soluble phosphate compound will vary between 1 and 1000 p. p. m., preferably between 1 and 200 p. p. m. Since problems of solubility will occur, the concentrations will be necessarily determined in the last instance by environmental factors such as pH, hardness, temperature, and amount of phosphate if any precipitated with the chromium.

The chromate used may be any water-soluble chromate, such as sodium chromate, sodium dichromate, potassium chromate, potassium dichromate, and corresponding water-soluble chromate and dichromate salts of lithium and ammonium and other water-soluble chromates and dichromates and chromic anhydride. The quantity in the water system will vary between 1 and 1000 p. p. m. and preferably between 1 and 200 p. p. m. calculated as the water-soluble chromate compound. There is no problem of solubility involved in ordinary waters, and the concentration of chromate will be largely influenced by economic considerations.

tion of an equivalent amount of chromate with subsequent reduction to chromium ion in the main water system by reducing substances such as hydrogen sulphide, sulphur dioxide, and organic ingredients.

In a series of tests with water of type III, in which hydrogen sulphide concentrations of 1.9 to 3.4 p. p. m. were present, the use of the coating type of protective treatment as developed by trivalent chromium was shown to be particularly effective. Table IV gives a series of these results, which established the power of trivalent chromium ion when present in an adequate concentration. The test period was one day, using ground surface high carbon steel specimens with surface under test of $3'' \times \frac{1}{2}'' \times \frac{1}{8}''$.

TABLE IV

| Test No. | Treatment | Type Water | pH | Wt. Loss (Mgs.) | Coating (Ppted.) | Products (Corrosion) | Tubercles | Attack | Distribution |
|---|---|---|---|---|---|---|---|---|---|
| 1 | None | III | 6.0 | 247 | None | Black, Heavy | No | General | Overall. |
| 2 | M | III | 6.0 | 26 | White | No | Yes | Shallow Pitting | |
| 3 | M* | III | 6.0 | 4 | Tan Yellow | No | No | Uniform Etch | |
| 4 | N | III | 6.0 | 108 | No | Black | No | General | Overall. |
| 5 | M | III | 6.0 | 3 | White | No | Few. Tiny | Uniform Etch | |

*3.2 p. p. m. $Cr^{+++}$ produced by reduction of 10 p. p. m. $Na_2CrO_4$.

The trivalent chromium compound may be any water-soluble chromic compound and any water-soluble chromous compound which through ease of oxidation under the conditions of use will be converted to chromic ions. Chromic chloride, nitrate and sulphate are examples. Suitable chromous salts are the acetate and chloride. The concentration of trivalent chromium ion will vary between 0.1 p. p. m. and 100 p. p. m. and in the preferred embodiment between 0.2 p. p. m. and 2.5 p. p. m.

Waters containing substantial contents of hydrogen sulphide present a special corrosion problem. As a result of this investigation, it has been found that the coating type treatment using phosphate combined with trivalent chromium ions, is particularly effective in waters containing reducing agents such as hydrogen sulphide. The use of phosphates alone has been singularly unsuccessful in such waters, showing less inhibiting power than in normal nonreducing water systems. Chromates alone in such systems when used without phosphates are subject to rapid and almost complete reduction to trivalent chromium. As a result, the chromate either entirely disappears or is reduced in concentration to such a low value that its effectiveness as a chromate is materially decreased. The maintenance of adequate levels of chromate concentration in such circumstances is prohibitively expensive and often leads only to maintaining an abundance of chromic ion which is not controlled, with attendant excessive precipitation, sludging and scale formation which interferes with normal operation of the system.

The chromic ion in itself has been shown in earlier discussions to be of limited corrosion inhibitory power. The use of phosphates with chromates, a combination which has considerable corrosion inhibitory power in reducing waters, is subject to the limitation that the chromate is reduced and attempts to maintain the required chromate residual result in the same difficulties which have been experienced with chromate alone.

The present inventors have found that where reducing waters are involved, the use of phosphates alone with trivalent chromium ion is a very effective corrosion inhibitor. In such treatment, the chromic ion is introduced directly or is rapidly developed by reducing chromate. The chromium concentration can then be controlled and maintained, with provision for a controlled precipitation of chromium as a protective coating. The trivalent chromium ion can be introduced as a soluble trivalent chromium compound or it can be produced by the introduc- Test No. 3 in Table IV used a treatment in which 3.2 p. p. m. of trivalent chromium ion was produced in the water by reduction of 10 p. p. m. of sodium chromate. Considering Table IV, it is seen that a treatment of 40 p. p. m. of sodium tripolyphosphate with 3 p. p. m. of trivalent chromium ion reduced the metal loss in one day to 26 milligrams and 3 milligrams. The variability of the weight losses (26 milligrams and 3 milligrams) is due to the initial effectiveness of the deposited coatings.

Adequate concentrations are necessary, as evidenced by the fact that higher weight losses occurred when only 1 p. p. m. trivalent chromium ion was present. Table IV, test 3, shows that the trivalent chromium ion obtained by reduction of chromate is just as effective as trivalent chromium ions introduced as such in test 2.

Chromate compounds can be used as sources of trivalent chromium ion when they act with reducing agents. The concentrations of chromates for such purposes are determined on the basis of equivalents of trivalent chromium ion over the trivalent chromium ion range from 0.1 to 100 p. p. m.

Organic reducing agents such as sugar, alcohol, tannin, lignin (including sulphonated lignin) and the like react slowly with chromates to reduce them to trivalent chromium. Examples of suitable materials are cane sugar, beet sugar, molasses, methyl alcohol, ethyl alcohol, propyl alcohol, isopropyl alcohol, any of the alcohols mentioned in Bernthsen, Organic Chemistry (1923), pages 68 to 86, and 446 to 448, and any of the commercial forms of tannin and lignin. When such organic reducing agents are present, it is possible to feed chromates with phosphates to produce a treatment which is a combination of phosphate, chromate and trivalent chromium ion. Such a treatment is very effective, as illustrated in Example 2.

The presence of such chromate-reactive organic reducing agents exerts benefits beyond the mere formation of trivalent chromium ion. Such an organic material used with phosphate and chromate, while still present in the unreacted state, begins to clean the metal surfaces and solubilize sludge and corrosion products. In addition, in cases where the calcium concentration is high, and therefore the phosphate concentration must be maintained low, increased contents of such organic materials augment the power of the treatments which would otherwise be obtained from chromates with lowered phosphate concentrations. Such organic reducing agents are valuable adjuncts to the chromic coating type of corrosion inhibition. The concentration levels of such organic reducing agents are not critical, and since they are not subject to the restrictions imposed on phosphates by calcium and magnesium, they can be used in the range from 1 to 1000 p. p. m. and preferably from 5 to 200 p. p. m.

In contrast to the treatments containing trivalent chromium ion which use the coating mechanism for protection, molybdenum compounds are effective in the soluble state to aid in inhibiting corrosion when used with phosphates and chromates. Hexavalent molybdenum in the form of molybdates of sodium or the like is very soluble, and protective coatings of molybdenum are not obtained under the test conditions. The addition of molybdate compound to water-soluble phosphate alone was not found to be appreciably effective. When added to a combination of phosphate and chromate within the ranges specified, however, vastly improved corrosion inhibitory behavior resulted. As shown by the tests, solubility of the molybdate compound is not a problem, and its effectiveness improves with increased concentration, so that levels of 0.1 to 100 p. p. m. of hexavalent molybdenum ion are used with success, and preferably in the range from 0.2 to 25 p. p. m. The molybdates are the most satisfactory materials to feed for reasons of suitability, availability and cost, suitable compounds being sodium molybdate, potassium molybdate, corresponding salts of lithium and ammonium, other water soluble molybdates, molybdic acid, sodium, ammonium and other alkali metal polymolybdates, ammonium and other alkali metal phospho-molybdates, and other suitable water-soluble hexavalent molybdenum compounds used under conditions in which the compound remains soluble. Molybdenum compounds of lower valences, although relatively insoluble in water, can be effectively used if they oxidize readily to the hexavalent form or are chemically altered to such form.

The water-soluble phosphate compounds, the water-soluble chromate compounds, and if desired, the water-soluble trivalent chromium compounds, can be effectively used with the molybdates in the concentrations above set forth.

In view of our invention and disclosure variations and modifications to meet individual whim or particular need will doubtless become evident to others skilled in the art, to obtain all or part of the benefits of my invention without copying the process and structure shown, and we therefore, claim all such insofar as they fall within the reasonable spirit and scope of our claims.

Having thus described our invention, what we claim as new and desire to secure by Letters Patent is:

1. The process of protecting the metal parts in a cooling water system against corrosion, which comprises flowing water in a stream through the cooling water system and maintaining the water continuously in contact with the metal parts, adding to the water between 1 and 1000 p. p. m. of water soluble phosphate compound, between 1 and 1000 p. p. m. of water soluble chromate compound, and between 0.1 and 100 p. p. m. calculated as metal ion of a water soluble compound of the class which consists of compounds of trivalent chromium and compounds of hexavalent molybdenum, while maintaining a pH in the range between 3 and 8.5 in the case of trivalent chromium and in the range between 5 and 9 in the case of hexavalent molybdenum, and depositing on the metal parts a continuously replenishing protective coating.

2. The process of claim 1, in which the phosphate is a complex phosphate.

3. The process of claim 1, which comprises adding to the water between 1 and 200 p. p. m. of the water soluble phosphate compound, between 1 and 200 p. p. m. of the water soluble chromate compound and between 0.2 and 25 p. p. m. calculated as metal ion of the water soluble compound of the class which consists of compounds of trivalent chromium and compounds of hexavalent molybdenum, while maintaining a pH in the range between 5 and 8.2 in the case of trivalent chromium and between 5.5 and 8.5 in the case of hexavalent molybdenum.

4. The process of claim 1 wherein the water circulated contains a naturally occurring sulphur containing reducing agent whereby the hexavalent chromium is reduced to trivalent chromium.

5. The process of claim 1 wherein the water circulated contains a naturally occurring reducing agent of the class consisting of sugars, alcohols, tannins and lignins.

6. The process of claim 1, which comprises also adding to the water between 1 and 1000 p. p. m. of an organic reducing agent of the class consisting of sugars, alcohols, tannins and lignins.

7. The process of protecting the metal parts in a cooling water system against corrosion, which comprises flowing water in a stream through the cooling water system and maintaining the water system continuously in contact with the metal parts, adding to the water between 1 and 1000 p. p. m. of water soluble phosphate compound, between 1 and 1000 p. p. m. of water soluble chromate compound, and chromium compound which on solution gives rise to between 0.1 and 100 p. p. m. of trivalent chromium ion, while maintaining a pH in the range between 3 and 8.5, depositing on the metal parts a protective coating and continually replenishing the protective coating.

8. The process of claim 7 which comprises adding to the water between 1 and 200 p. p. m. of water soluble phosphate compound, between 1 and 200 p. p. m. of water soluble chromate compound, and chromium compound which on solution gives rise to between 0.2 and 25 p. p. m. of trivalent chromium ion, while maintaining a pH in the range between 5 and 8.2.

9. The process of claim 7, which comprises also adding to the water between 1 and 1000 p. p. m. of organic reducing agent of the class consisting of sugars, alcohols, tannins and lignins.

10. The process of protecting metal parts in a cooling water system against corrosion, which comprises flowing water having a naturally occurring sulphur containing reducing agent therein in a stream through the cooling water system and maintaining the water continuously in contact with the metal parts, adding to the water between 1 and 1000 p. p. m. of a water soluble chromate compound, while maintaining a pH in the range between 3 and 8.5, reducing the water soluble chromate compound to trivalent chromium ion by said sulphur containing reducing agent in the water, and thereby building up in the water a concentration of trivalent chromium ion between 0.1 and 1000 p. p. m., depositing on the metal parts a protective coating and continuously replenishing the protective coating.

11. The process of protecting metal parts in a cooling water system against corrosion, which comprises flowing water in a stream through the cooling water system and maintaining the water continuously in contact with the metal parts, adding to the water between 1 and 1000 p. p. m. of a water soluble phosphate compound, adding to the water between 1 and 1000 p. p. m. of a water soluble chromate compound, while maintaining a pH in the range of 3 and 8.5, reducing the water soluble chromate compound to trivalent chromium ion by an organic reducing agent of the class consisting of sugars, alcohols, tannins and lignins, and thereby building up in the water a concentration of trivalent chromium ion between 0.1 and 100 p. p. m., depositing on the metal parts a protective coating and continuously replenishing the protective coating.

References Cited in the file of this patent

UNITED STATES PATENTS

| | | |
|---|---|---|
| 2,126,430 | Unger | Aug. 9, 1938 |
| 2,299,748 | Hatch | Oct. 27, 1942 |
| 2,673,817 | Burns | Mar. 30, 1954 |

FOREIGN PATENTS

| | | |
|---|---|---|
| 517,916 | Great Britain | Feb. 13, 1940 |
| 368,619 | Great Britain | Mar. 10, 1932 |
| 547,408 | Great Britain | Aug. 26, 1942 |
| 227,825 | Switzerland | Oct. 1, 1943 |
| 698,699 | France | Feb. 3, 1931 |

OTHER REFERENCES

Robertson: J. Electrochemical Soc., vol. 98, No. 3, March 1951, pp. 94–100 (p. 94 has abstract).

Laudermilk: Oil and Gas J., December 7, 1946, pp. 105–110 (pp. 105–6 pert.).